US008760082B2

(12) United States Patent
Yang et al.

(10) Patent No.: US 8,760,082 B2
(45) Date of Patent: Jun. 24, 2014

(54) LED EMITTING DEVICE

(75) Inventors: Seunguk Yang, Anyang (KR); Byunghak Ahn, Seoul (KR); Hak-Hee Lee, Bucheon (KR); Eung-Woo Lee, Seoul (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 477 days.

(21) Appl. No.: 13/225,953

(22) Filed: Sep. 6, 2011

(65) Prior Publication Data

US 2012/0104956 A1 May 3, 2012

(30) Foreign Application Priority Data

Oct. 28, 2010 (KR) .................. 10-2010-0106272

(51) Int. Cl.
*H05B 33/02* (2006.01)
*H05B 37/02* (2006.01)

(52) U.S. Cl.
USPC ............ 315/307; 315/192; 315/224; 315/308

(58) Field of Classification Search
CPC ........ H05B 37/00; H05B 37/02; H05B 33/00; H05B 33/02; H05B 33/08; H05B 33/0803; H05B 33/0806; H05B 33/0809; H05B 33/0812; H05B 33/0815; H05B 33/0821; H05B 33/0824; H05B 33/0827; H05B 33/083; H05B 33/0833; H05B 33/0836; H05B 33/0839; H05B 33/0842; Y02B 20/00; Y02B 20/30; Y02B 20/325; Y02B 20/341; Y02B 20/346; Y02B 20/40
USPC ................ 315/291, 224, 225, 219, 307, 308, 315/185 R, 192
See application file for complete search history.

(56) References Cited

U.S. PATENT DOCUMENTS

| 5,619,403 | A | 4/1997 | Ishikawa et al. | |
|---|---|---|---|---|
| 2006/0186827 | A1* | 8/2006 | Ragonesi et al. | 315/185 S |
| 2010/0013395 | A1* | 1/2010 | Archibald et al. | 315/185 R |
| 2011/0068700 | A1* | 3/2011 | Fan | 315/185 R |

FOREIGN PATENT DOCUMENTS

KR    10-0666829 B1    4/2007

OTHER PUBLICATIONS

NCP4326—Secondary Controller for Multi-Output Quasi-Resonant Switchmode Power Supplies, Sep. 2005, Rev. 1, pp. 1-30, ON Semiconductor.

* cited by examiner

*Primary Examiner* — David H Vu
(74) *Attorney, Agent, or Firm* — Okamoto & Benedicto LLP

(57) ABSTRACT

The present invention relates to an LED emitting device. The LED emitting device includes: a converter converting an input voltage according to a switching operation of a power source switch to generate at least two output voltages; an LED panel unit including a plurality of LED channels having a plurality of LEDs; a micom board operated by a first output voltage among the at least two output voltages to control the operation of the LED emitting device; a regulator converting a second output voltage among the at least two output voltages into a voltage suitable for the operation of the LED panel unit; and a multi-channel control unit controlling an operation of the regulator according to a lowest minimum voltage among the voltages of a plurality of LED channels and receiving the first output voltage to generate a first feedback voltage VF1.

15 Claims, 4 Drawing Sheets

LED EMITTING DEVICE

CROSS-REFERENCE TO RELATED APPLICATION

This application claims priority to and the benefit of Korean Patent Application No. 10-2010-0106272 filed in the Korean Intellectual Property Office on Oct. 28, 2010, the entire contents of which are incorporated herein by reference.

BACKGROUND (a) Field

The present invention relates to an emitting device using an LED.

(b) Description of the Related Art

A light emitting device using LEDs supplies currents to the LEDs so as to drive the LEDs. Then, the LEDs emit beams having brightness corresponding to the currents. Such an LED light emitting device can be used as a light source of an LCD panel unit or for lighting. A light emitting device that uses LEDs and is used as a light source of an LCD panel unit or lighting is referred to as an LED light emitting device. An LED light emitting device provides a predetermined intensity by making a predetermined current flow in each LED channel including a plurality of LEDs connected in series.

The LED emitting device needs a main power source to respectively supply a current to a plurality of LED channels and an assistance power source required for operation of a main control unit to control operation of an LED emitting device. A conventional LED emitting device separately includes a main power supply device to generate the main power source and an assistance power supply device to generate an assistance power source.

The LED emitting device must include two power supply devices such that it supplies power to the LED emitting device and to the main control unit. Also, a power source control IC to control two power supply devices is separately required. This is causes an increase in the production cost of the LED emitting device.

The above information disclosed in this Background section is only for enhancement of understanding of the background of the invention and therefore it may contain information that does not form the prior art that is already known in this country to a person of ordinary skill in the art.

SUMMARY

An embodiment of the present invention is directed toward an LED emitting device capable of supplying two power sources through two channels.

An LED emitting device operated by at least two output voltages according to an embodiment of the present invention includes a converter converting an input voltage according to a switching operation of a power source switch to generate at least two output voltages, an LED panel unit including a plurality of LED channels having a plurality of LEDs, a micom board operated by a first output voltage among the at least two output voltages to control the operation of the LED emitting device, a regulator converting a second output voltage among the at least two output voltages into a voltage suitable for the operation of the LED panel unit, and a multi-channel control unit controlling an operation of the regulator according to the lowest minimum voltage among the voltages of a plurality of LED channels and receiving the first output voltage to generate a first feedback voltage VF1.

The multi-channel control unit detects a load of the LED panel unit to stop the operation of the regulator when the LED panel is in a no-load state.

The converter includes a transformer converting an input voltage input to a primary first winding according to operation of a power source switch to transmit to a secondary second winding and a third winding, a first rectifying diode connected to the second winding, a second rectifying diode connected to the third winding, and a first capacitor connected to the first rectifying diode, wherein the first output voltage may be a voltage of the first capacitor.

The regulator includes a power source supply switch connected to the second rectifying diode and operated according to control of the multi-channel control unit to output the voltage of the third winding passing through the second rectifying diode, and a second capacitor connected to the power source supply switch, wherein the second output voltage may be a voltage of the second capacitor.

The multi-channel control unit includes a minimum voltage detecting unit sampling a plurality of channel voltages as a unit of a predetermined time to detect the lowest minimum voltage, and a switch control unit generating a gate signal to control the switching operation of the power source supply switch for the minimum voltage to be maintained as a predetermined reference voltage.

The switch control unit detects a plurality of dimming signals controlling each on/off function of the plurality of LED channels generated from the micom board to determine the LED panel to be in the no-load state and to turn off the power source supply switch when the plurality of dimming signals turn off all the plurality of LED channels.

The multi-channel control unit includes a first resistor including one terminal transmitted with the output voltage, and a shunt regulator including an input terminal connected to one terminal of the resistor and an output terminal of which the voltage is maintained as a constant voltage if the voltage of the input terminal is more than a predetermined threshold voltage, wherein the voltage of the output terminal may be the first feedback voltage, and as the voltage of the input terminal is increased to be more than the threshold voltage, the current from the output terminal of the shunt regulator to the ground is increased.

The LED emitting device further includes an opto-diode connected between the output terminal of the shunt regulator and the predetermined reference voltage, and an opto-coupler including an opto-transistor flowing with the current corresponding to the brightness of the opto-diode.

The LED emitting device further includes a switch control unit generating a gate signal controlling a switching operation of the power source switch according to the current flowing in the opto-transistor.

The multi-channel control unit further includes a third capacitor connected between the output terminal of the shunt regulator and the input terminal.

The multi-channel control unit determines an overflowed voltage of the second output voltage by using the second feedback voltage according to the second output voltage, and detects the LED channel that is in an open state among the plurality of LED channels by using a plurality of channel feedback voltages corresponding to a plurality of channel currents flowing in the plurality of LED channels.

The multi-channel control unit further includes a protection circuit unit comparing the second feedback voltage with the predetermined first reference voltage to determine it as the overflowed voltage if the second output voltage is a higher voltage than the reference voltage, to determine the generation of the LED channel that is in the open state if a smaller voltage than the predetermined second reference voltage is detected among the plurality of channel feedback voltages, and to generate a protection signal to stop the switching operation of the power source supply switch.

The LED emitting device further includes a current balancing unit connected to an end terminal of the plurality of LED channel and controlling a channel current of the plurality of LED channels.

The current balancing unit includes a plurality of transistors respectively connected to the plurality of LED channels, and a plurality of resistors connected to the plurality of transistors and generating a plurality of channel feedback voltages corresponding to a plurality of channel currents flowing in the plurality of LED channels.

The multi-channel control unit further includes a gate signal generator receiving a dimming signal controlling the duty of the plurality of LED channels from the micom board to control each on/off function of the plurality of LED channels, and receiving the plurality of channel feedback voltages to generate a plurality of gate signals controlling the plurality of transistors such that the plurality of LED channels flow with a constant current.

An embodiment of the present invention provides an LED emitting device respectively supplying a power source through two channels, and a driving method thereof.

DETAILED DESCRIPTION OF THE EMBODIMENTS

Figure 1:
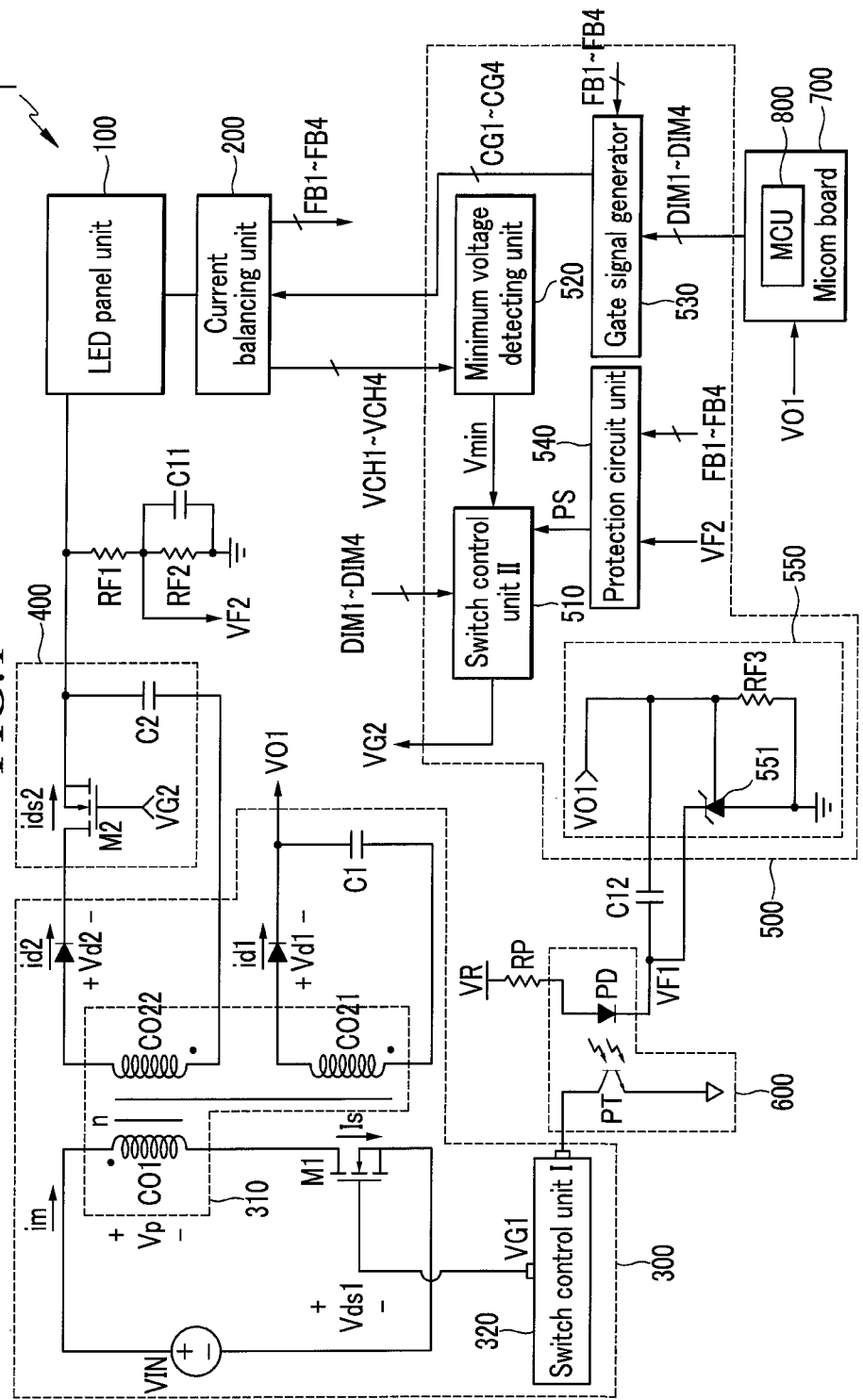
FIG. 1 is a view showing a portion of an LED emitting device according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

Exemplary embodiments of the present invention that can be realized by a person skilled in the art will now be described with reference to drawings.

FIG. 1 is a view showing a portion of an LED emitting device according to an exemplary embodiment of the present invention.

Figure 2:
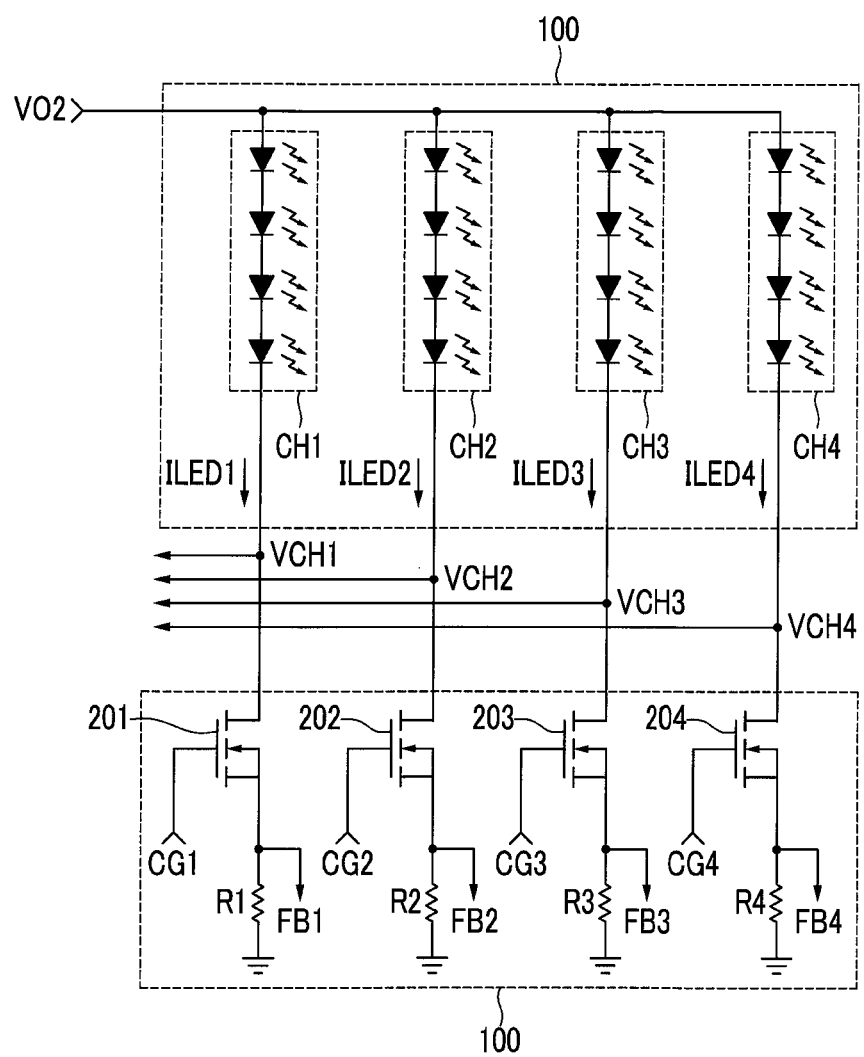
FIG. 2 is a view showing a portion of an LED emitting device according to an exemplary embodiment of the present invention.

FIG. 2 is a view showing a portion of an LED emitting device according to an exemplary embodiment of the present invention.

As shown in FIG. 1 and FIG. 2, an LED light emitting device 1 includes an LED panel unit 100, a current balancing unit 200, a flyback converter 300, a regulator 400, a multi-output control unit 500, an opto-coupler 600, and a micom board 700.

The LED panel unit 100 includes a plurality of LED channels CH1-CH4, and a plurality of LEDs are connected in series in each of the plurality of LED channels CH1-CH4. FIG. 2 shows four LEDs connected in series in the plurality of LED channels CH1-CH4, however this is only one example and the present invention is not limited thereto.

The flyback converter 300 includes a transformer 310, a switch control unit 320, a power source switch M1, two rectifying diodes D1 and D2, and a smoothing capacitor C1. The flyback converter 300 converts an input voltage according to a switching operation of the power source switch M1 to generate at least two output voltages.

The at least two output voltages according to an exemplary embodiment of the present invention include an output voltage VO2 for the operation of the LED panel unit 100 and an output voltage VO1 for the operation of the micom board 700. This is only one example and the present invention is not limited thereto, and the flyback converter is one among converters and the present invention is not limited thereto.

The transformer 310 converts the input voltage VIN according to the switching operation of the power source switch M1 connected to the primary winding to transmit it to the secondary winding. The transformer 310 includes the primary winding CO1 and the two secondary windings CO21 and CO22. The primary winding CO1 is referred to as "the first winding", the winding CO21 of the two secondary windings is referred to as "the second winding", and the winding CO22 thereof is referred to as "the third winding".

The first winding CO1 and the third winding CO22 are insulated and coupled with a predetermined winding ratio to supply the output voltage VO2 required for the LED panel unit 100. The first winding CO1 and the second winding CO21 are insulated and coupled with a predetermined winding ratio to supply the output voltage VO1 required for the micom board 700 controlling the LED emitting device. The first winding CO1 includes one terminal transmitted with the input voltage VIN and the other terminal connected to a drain electrode of the power source switch M1. A winding number of the first winding CO1 is referred to as NP, the winding number of the second winding CO21 is referred to as NS1, and the winding number of the third winding CO22 is referred to as NS2.

The micom board 700 as a configuration controlling the operation of the LED emitting device 1 processes the signals that are input and output to and from the LED emitting device. The micom board 700 includes a main control unit (MCU) 800, and the main control unit 800 generates a plurality of dimming signals DIM1-DIM4 controlling each emitting period of the plurality of LED channels CH1-CH4. The dimming signals DIM1-DIM4 emit the corresponding LED channel during an on duty period. The dimming signals DIM1-DIM4 are transmitted to the multi-output control unit 500.

The rectifying diode D1 connected to the second winding CO21 rectifies the voltage of the second winding CO21, and the rectified voltage is generated as the output voltage VO1 through the smoothing capacitor C1.

The power source switch M1 is connected to the transformer 310 to control the operation of the transformer 310, thereby controlling the power source transmitted to the secondary. The power source switch M1 is switched by the gate signal VG1 output from the switch control unit 320.

The regulator 400 converts the voltage passing through the rectifying diode D2 of the transformer 310 into the output voltage VO2 through the switching operation of the power source supply switch M2. The output voltage VO2 converted by the regulator 400 has a level that is suitable for the operation of the LED panel unit 100. The regulator 400 includes the power source supply switch M2 and the capacitor C2.

If the power source switch M1 is turned off and the rectifying diode D2 is biased in a forward direction, the voltage of the third winding CO22 is transmitted to the power source supply switch M2. Here, a voltage drop generated in the rectifying diode D2 is disregarded. When the power source supply switch M2 is in the turn-on state, the capacitor C2 is charged by the voltage of the third winding CO22 to generate the output voltage VO2.

The switching operation of the power source supply switch M2 is controlled for the output voltage VO2 to be a voltage of a level capable of operating the LED panel unit 100.

The multi-output control unit 500 generates the gate signal VG2 to control the switching operation of the power source supply switch M2. The multi-output control unit 500 generates the gate signal VG2 according to the lowest voltage Vmin among the channel voltages VCH1-VCH4 of a plurality of LED channels CH1-CH4.

The multi-output control unit 500 receives the output voltage VO1 to generate the feedback voltage VF1 and to transmit it to the opto-coupler 600. Also, an overflowed voltage of the output voltage VO2 and an open LED channel may be detected by the feedback voltage VF2 flowing to the output voltage VO2 and the feedback voltages FB1-FB4 corresponding to the current respectively flowing in a plurality of LED channels CH1-CH4.

A detailed description for the multi-output control unit 500 will be described later.

Next, an operation of the transformer 310, the power source switch M1, the rectifying diodes D1 and D2, and the power source supply switch M2 according to an exemplary embodiment of the present invention will be described with reference to FIG. 3 and FIG. 4.

Figure 3:
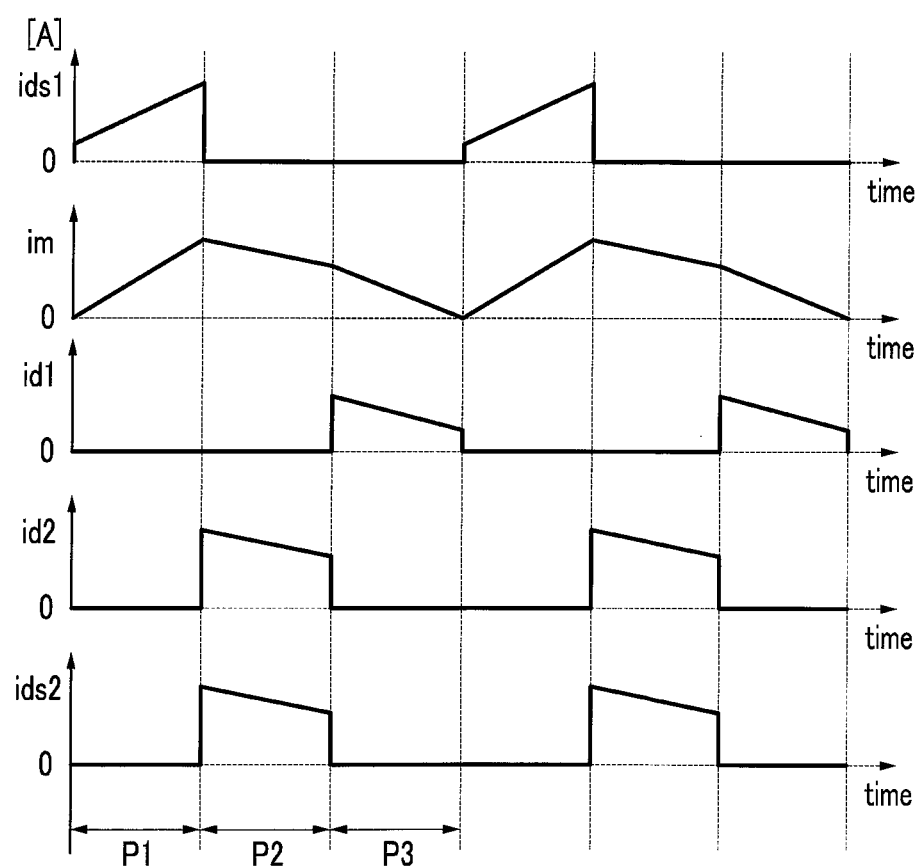
FIG. 3 is a view of a current of a power source switch, the primary current of a transformer, a current of a rectifying diode, and a current of a power source supply switch according to an exemplary embodiment of the present invention.

FIG. 3 is a view of a current of a power source switch, the primary current of a transformer, a current of a rectifying diode, and a current of a power source supply switch according to an exemplary embodiment of the present invention.

Figure 4:
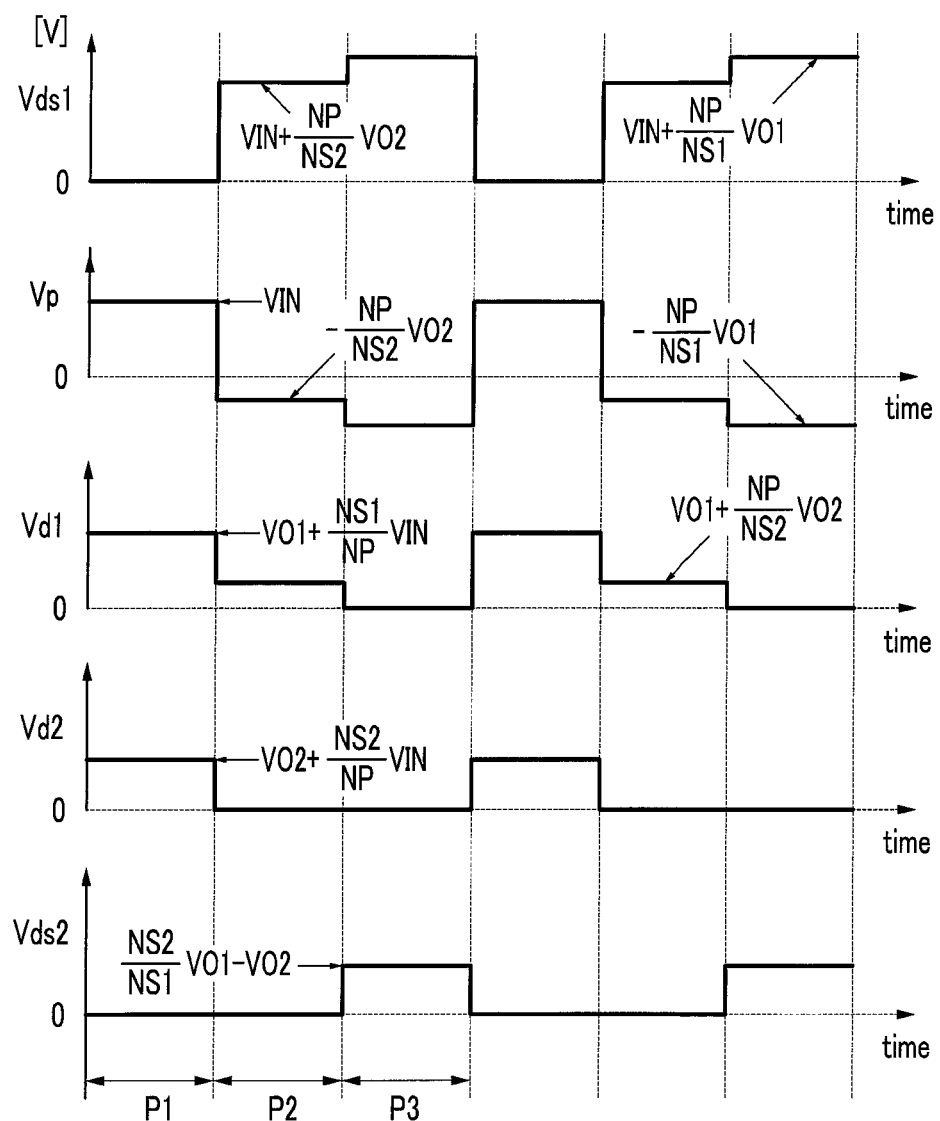
FIG. 4 is a view of a voltage of a power source switch, a winding voltage of the first winding, a voltage of a rectifying diode, and a voltage of a power source supply switch according to an exemplary embodiment of the present invention.

FIG. 4 is a view of a voltage of a power source switch, a winding voltage of the first winding, a voltage of a rectifying diode, and a voltage of a power source supply switch according to an exemplary embodiment of the present invention.

The primary current im of the transformer 310 is increased during the period P1 in which the power source switch M1 is in the on state, and the winding voltage VP of the first winding CO1 becomes the input voltage VIN. The power source switch M1 is in the turned-on state during the period P1 such that the voltage of the power source switch M1 is 0. Energy is accumulated to the primary of the transformer 310 during the period P1.

The winding voltage of the third winding CO22 becomes the voltage VIN*NS2/NP of which the winding ratio NS2/NP of the first winding and the third winding is multiplied by the winding voltage VP (i.e., input voltage VIN) during the period P1 in which the power source switch M1 is in the on state. The winding voltage of the third winding CO22 has opposite polarity to that of the winding voltage VP such that the voltage Vd2 of the rectifying diode D2 becomes the voltage of which the voltage VIN*NS2/NP is added to the output voltage VO2.

The winding voltage of the second winding CO21 becomes the voltage VIN*NS1/NP of which the winding ratio NS1/NP of the first winding CO1 and the second winding CO21 is multiplied by the winding voltage VP (i.e., input voltage VIN) during the period P1 in which the power source switch M1 is in the on state. The winding voltage of the second winding CO21 has opposite polarity to that of the winding voltage VP such that the voltage Vd1 of the rectifying diode D1 becomes the voltage of which the voltage VIN*NS1/NP is added to the output voltage VO1.

The rectifying diode D1 and the rectifying diode D2 are biased in the backward direction thereby being in the off state during the period P1 in which the power source switch M1 is in the on state. Accordingly, the first rectifying current ids1 and the second rectifying current ids2 do not flow. The second rectifying current ids2 does not flow such that the current ids2 of the power source supply switch M2 does not flow during the period P1.

If the power source switch M1 is turned off, the primary current im of the transformer 310 is decreased. If the power source switch M1 is turned off, the winding voltage VP is determined according to the winding voltage of the second and third windings CO21 and CO22.

The regulator 400 generates the winding voltage of the third winding CO22 passing through the rectifying diode D2 as the output voltage VO2 according to the switching operation of the power source supply switch M2. Accordingly, the output voltage VO2 may not be a larger voltage than the winding voltage of the third winding CO22. Also, the duty of the output voltage VO2 is equal to or less than the duty of the winding voltage of the third winding CO22.

To drive the LED panel 100, that is, the load, through the duty of the output voltage VO2, the current peak supplied to the LED panel 100 must be high. In detail, to drive the LED panel 100 through the output voltage VO2 having the small duty compared with the output voltage VO1, the current peak supplied to the load along with the output voltage VO1 is larger than the current peak supplied to the load along with the output voltage VO1. For such reason, the winding voltage of the second winding CO21 is less than the output voltage VO1 during the period P2 in which the power source supply switch M2 is turned on and the rectifying current id2 flows. Accordingly, the rectifying diode D1 is in the off state during the period P2.

If the power source supply switch M2 is turned off during the period P3, the winding voltage of the second winding CO21 is larger than the output voltage VO1 such that the rectifying diode D1 is turned on.

As shown in FIG. 2, the rectifying current id2 flows during the period P2 in which the power source switch M1 is turned off and the power source supply switch M2 is in the turn-on state. The rectifying diode D1 is turned on during the period P3 in which the power source switch M1 is turned off and the power source supply switch M2 becomes in the turn-off state such that the rectifying current id1 flows and the rectifying current id2 does not flow.

Hereafter, the voltage drop generated in the rectifying diode is very small compared with the winding voltage and the output voltage such that it is disregarded. Accordingly, when the rectifying diodes D1 and D2 are turned on, it is assumed that the winding voltages of the second and third windings CO21 and CO22 are the same as the output voltages VO1 and VO2.

During the period P2, the winding voltage VP of the first winding CO1 becomes the negative voltage −VO2*(NP/NS2) of which the winding voltage (i.e., output voltage VO2) of the third winding CO22 is multiplied by the winding ratio NP/NS2. The drain-source voltage of the power source switch M1 becomes the voltage of which the winding voltage VP is subtracted from the input voltage VIN such that it becomes the voltage VIN+VO2*(NP/NS2).

The rectifying diode D2 and the power source supply switch M2 are in the on state during the period P2 such that the voltage VD2 of the rectifying diode D2 and the drain-source voltage VD2 of the power source supply switch M2 are 0. The winding voltage of the second winding CO21 is the voltage of which the winding ratio NS1/NS2 is multiplied by the winding voltage of the third winding CO22. Accordingly, the voltage VD1 of the rectifying diode D1 becomes the voltage VO1+VO2I·(NS1/NS2) during the period P2.

The primary current im is converted according to the winding ratio NS2/NP during the period P2 and then flows through the rectifying diode D2 and the power source supply switch M2. Accordingly, the rectifying current id2 and the power source supply switch current ids2 flow.

During the period P3, the winding voltage VP of the first winding CO1 becomes the negative voltage −VO1*(NP/NS1) of which the winding ratio NP/NS1 is multiplied by the winding voltage (i.e., output voltage VO1) of the second winding CO21. The drain-source voltage of the power source switch M1 becomes the voltage VIN+VO1*(NP/NS1) of which the winding voltage VP is subtracted from the input voltage VIN.

The rectifying diode D1 is in the on state during the period P3 such that the voltage VD1 of the rectifying diode D1 is 0. The winding voltage of the second winding CO21 is larger than the output voltage VO2 such that the rectifying diode D2 is in the on state during the period P3. Accordingly, the voltage VD2 of the rectifying diode D2 is 0.

The winding voltage of the third winding CO22 is the voltage of which the winding ratio NS2/NS1 is multiplied by the winding voltage of the second winding CO21. Accordingly, the drain-source voltage VDS2 of the power source supply switch M2 becomes the voltage VO1*(NS2/NS1)−VO2 during the period P3.

During the period P3, the primary current im is converted according to the winding ratio NS1/NP and then flows through the rectifying diode D1. Accordingly, the rectifying current id1 flows.

According to this operation, the output voltage VO1 and the output voltage VO2 are generated.

When the output voltage VO1 is decreased, the duty of the power source switch M1 is increased. Thus, the peak current of the rectifying current id1 and the rectifying current id2 are increased such that the further large power source may be supplied to the secondary. Also, when the minimum voltage Vmin as the lowest voltage among a plurality of channel voltages VCH1-VCH4 becomes smaller than a predetermined reference voltage, the duty of the power source supply switch M2 is increased to increase the period in which the rectifying current id2 flows. Thus, the further large power source is supplied to the load, that is, the LED panel 100, such that the minimum voltage Vmin is increased to the voltage that is larger than the reference voltage.

The configuration of the LED emitting device according to an exemplary embodiment of the present invention will be described again with reference to FIG. 1 and FIG. 2.

The current balancing unit 200 is connected to each end terminal of a plurality of LED channels CH1-CH4 to control each channel current ILED1-ILED4 of the plurality of LED channels CH1-CH4. The current balancing unit 200 includes a plurality of transistors 201-204 respectively connected to a plurality of LED channels CH1-CH4 and a plurality of resistors R1-R4 having one terminal connected to the plurality of transistors 201-204 and the other terminal that is grounded. The plurality of transistors 201-204 are operated according to gate signals CG1-CG4 transmitted from the multi-output control unit 500. A plurality of channel currents ILED1-ILED4 respectively flow in a plurality of resistors R1-R4 such that a plurality of channel feedback voltages FB1-FB4 are transmitted to the multi-output control unit 500.

The voltages of the end terminals connected to a plurality of transistors 201-204 corresponding to a plurality of LED channels CH1-CH4 are respectively referred to as channel voltages VCH1-VCH4. The channel voltage is the voltage required to flow a constant channel current to each channel. When the channel voltage is larger than the predetermined reference voltage, it is difficult for a constant current to flow to the corresponding channel. Accordingly, the multi-channel control unit 500 increases the output voltage VO2 when the channel voltage is decreased to control the regulator such that the channel current may constantly flow. A plurality of channel voltages VCH1-VCH4 are transmitted to the multi-output control unit 500.

The transistors 201-204 according to an exemplary embodiment of the present invention are N channel type MOSFETs, however the present invention is not limited thereto.

The multi-output control unit 500 controls the duty of the plurality of LED channels CH1-CH4 according to the dimming signals DIM1-DIM4 and the operation of the regulator 400 by using the channel voltages VCH1-VCH4, the feedback voltages FB1-FB4, and the feedback voltage VF2, and generates the feedback signal VF1 according to the output voltage VO1. Also, the power source control unit 400 detects the LED channel as the open state among a plurality of LED channels CH1-CH4 by using a plurality of channel feedback voltages FB1-FB4 and determines the overflowed voltage of the output voltage VO2 by using the feedback voltage VF2.

As shown in FIG. 1, the multi-output control unit 500 includes a switch control unit 510, a minimum voltage detecting unit 520, a gate signal generator 530, a protection circuit unit 540, and a feedback generator 550.

The gate signal generator 530 controls the on/off of a plurality of LED channels CH1-CH4 according to the dimming signals DIM1-DIM4 controlling a plurality of LED channels CH1-CH4. Also, the gate signal generator 530 receives the channel feedback voltages FB1-FB4 to detect a plurality of channel currents ICH1-ICH4 and generates the plurality of gate signals CG1-CG4 controlling the connection degree of a plurality of transistors 201-204 for a plurality of channel currents ICH1-ICH4 to constantly flow. The plurality of gate signals CG1-CG4 are respectively transmitted to the gate electrodes of the corresponding switches 201-204. The minimum voltage detecting unit 520 receives a plurality of channel voltages VCH1-VCH4 of which a plurality of channel currents ILED1-ILED4 flow and detects the lowest voltage among the plurality of transmitted channel voltages VCH1-VCH4 as the minimum voltage Vmin. The detected minimum voltage Vmin is transmitted to the switch control unit 510.

The minimum voltage detecting unit 520 samples a plurality of channel voltages VCH1-VCH4 for a unit of a predetermined time. The minimum voltage detecting unit 520 detects the lowest voltage among the plurality of sampled channel voltages VCH-CH4 as the minimum voltage Vmin. Here, the channel voltage of the channel in which the channel current does not flow is not sampled. That is, the minimum voltage Vmin is detected among the channel voltages of the LED channels that are operated.

The switch control unit 510 generates the gate signal VG2 according to the minimum voltage Vmin. The switch control unit 510 generates the gate voltage VG2 to control the switching operation of the power source supply switch M1 for the minimum voltage Vmin to be maintained as the predetermined reference voltage. If the output voltage VO2 is decreased such that a voltage of more than a predetermined threshold voltage is not supplied to the plurality of LED channels CH1-CH4, the minimum voltage Vmin becomes the voltage that is smaller than the reference voltage. The threshold voltage means the voltage required for the LED channel currents ILED1-ILED4 flowing in a plurality of LED channels CH1-CH4 to flow with the constant level.

As the output voltage VO2 is the larger voltage than the threshold voltage, the consumption power source generated in the LED panel 100 is increased such that it is preferable that the output voltage VO2 is constantly maintained with the threshold voltage. Accordingly, the switch control unit 510 generates the gate signal VG2 for the minimum voltage Vmin to be constantly maintained with the reference voltage.

In detail, the switch control unit 510 may control the duty of the gate signal VG2 according to the minimum voltage Vmin. The switch control unit 510 controls the duty of the gate signal VG2 according to an error of the minimum voltage Vmin and the reference voltage. If the minimum voltage Vmin is smaller than the reference voltage, the switch control unit 510 increases the duty of the gate signal VG2. If the minimum voltage Vmin is larger than the reference voltage, the switch control unit 510 decreases the duty of the gate signal VG2.

The duty control of the present invention is not limited. That is, the switch control unit 510 of the present invention may control the switching frequency of the power source supply switch M2 to constantly maintain the minimum voltage Vmin as the reference voltage along with the duty control. For example, the on-period in which the voltage Vd2 is the high level is temporally divided to increase the frequency of the power source supply switch M2. If the frequency of the power source supply switch M2 is increased, the output voltage VO2 is decreased.

If a protection signal PS enabling the protection operation is input from the protection circuit unit 540, the switch control unit 510 generates the gate signal VG2 preventing the switching operation of the power source supply switch M2.

Also, the switch control unit 510 detects a plurality of dimming signals DIM1-DIM4 to generate the gate signal VG2 turning off the power source supply switch M2 when the load of the LED panel unit 100 is in the no-load state. In detail, when all dimming signals DIM1-DIM4 have the level for turning off all LED channels CH1-CH4, the switch control unit 510 determines the LED panel unit 100 to be in the no-load state such that the gate signal VG2 turning off the power source supply switch VG2 is generated. If the protection circuit unit 540 senses the channel feedback voltages FB1-FB4 such that the open LED channel is detected, the protection signal PS enabling the protection operation is generated. If the LED channel is in the open state, the channel feedback voltage becomes a voltage near the ground voltage. The protection circuit unit 540 compares a plurality of channel feedback voltages FB1-FB4 with the predetermined reference voltage such that if the channel feedback voltages FB1-FB4 that are smaller than the reference voltage is detected, the protection signal PS of the enable level is generated.

Also, the protection circuit unit 540 generates the protection signal PS enabling the protection operation when the feedback voltage VF2 is the overflowed voltage. The protection circuit unit 540 compares the feedback voltage VF2 with the predetermined reference voltage, and if the feedback voltage VF2 is higher than the reference voltage, the protection signal PS of the enable level is generated.

The feedback generator 550 generates the feedback voltage VF1 corresponding to the output voltage VO1 and supplies it to the opto-coupler 600. The feedback generator 550 includes a shunt regulator 551 and a resistor RF3 to generate the feedback voltage VF1.

The resistor RF3 includes one terminal applied with the output voltage VO1 and the other terminal that is grounded. One terminal of the resistor RF3 is connected to the input terminal of the shunt regulator 551.

The shunt regulator 551 includes the input terminal input with the output voltage VO1 and the output terminal outputting the feedback voltage VF1. If the shunt regulator 551 is grounded and the voltage of the input terminal of the shunt regulator 551 is more than the predetermined threshold voltage, a current that flows from the output terminal to the ground is generated. When the input terminal voltage of the shunt regulator 551 is more than the threshold voltage, as the input terminal voltage of the shunt regulator 551 is increased, the current flowing from the output terminal to the ground is increased.

When the output voltage VO1 is more than the predetermined threshold voltage, although the output voltage VO1 is changed, the shunt regulator 551 constantly maintains the voltage of the output terminal, that is, the feedback voltage VF1, through this operation. As the output voltage VO1 is increased, the current flowing from the output terminal to the ground is increased.

The capacitor C12 is connected between the input terminal and the output terminal of the shunt regulator 551 such that the feedback voltage VF1 is not affected by a liftoff component of the output voltage VO1.

The opto-coupler 600 includes an opto-diode PD and an opto-transistor PT. One terminal of the resistor RP is connected to the reference voltage VR. The cathode of the opto-diode PD is connected to the output terminal of the shunt regulator 551, and the anode of the opto-diode PD is connected to the other terminal of the resistor RP.

If the opto-diode PD emits light according to the flowing current, the current corresponding to the brightness of the opto-diode PD flows in the opto-transistor PT. The opto-diode PD and the opto-transistor PT are insulated from each other such that the switch control unit 320 controlling the flyback converter 300 is positioned at the primary. Accordingly, the switch control unit 320 is not affected by interference generated from other configurations, and may stably control the switching operation of the power source switch M1.

If the current flowing in the shunt regulator 551 is increased, the current flowing in the opto-diode PD is increased such that the current flowing in the opto-transistor PT is increased. That is, as the output voltage VO1 is increased, the current flowing in the opto-transistor PT is increased.

The switch control unit 320 detects the output voltage VO1 according to the current flowing in the opto-transistor PT to control the duty of the power source switch M1. As the current flowing in the opto-transistor PT is increased, the switch control unit 320 decreases the duty of the power source switch M1, and thereby the power source transmitted to the secondary is decreased. Thus, the voltage supplied to the output voltage VO1 and the regulator 400 is decreased.

In contrast, as the current flowing in the opto-transistor PT is decreased, the switch control unit 320 increases the duty of the power source switch M1, and thereby the power source transmitted to the secondary is increased. Thus, the voltage supplied to the output voltage VO1 and the regulator 400 is increased.

As described above, the multi-channel control unit 500 of the present invention controls the operation of the regulator 400 and generates the feedback voltage VF1 to control the operation of the flyback converter 300, and thereby the emitting operation of the LED panel unit 100 may be controlled.

The drawings and the detailed description described above are examples for the present invention and are provided to explain the present invention, and the scope of the present invention described in the claims is not limited thereto. Therefore, it will be appreciated to those skilled in the art that various modifications may be made and other equivalent embodiments are available. Accordingly, the actual scope of the present invention must be determined by the spirit of the appended claims.

DESCRIPTION OF SYMBOLS

LED emitting device 1, LED panel unit 100, current balancing unit 200 flyback converter 300, regulator 400, multi-output control unit 500 opto-coupler 600, micom board 700, LED channel CH1-CH4 transformer 310, switch control unit 320, power source switch M1 rectifying diode D1 and D2, smoothing capacitor C1, winding CO1, CO21, CO22 switch control unit 510, minimum voltage detecting unit 520, gate signal generator 530 protection circuit unit 540, feedback generator 550, shunt regulator 551, resistor RF3

What is claimed is:

1. An LED emitting device operated by at least two output voltages, comprising:
a converter converting an input voltage according to a switching operation of a power source switch to generate at least two output voltages;
an LED panel unit including a plurality of LED channels having a plurality of LEDs;
a micom board operated by a first output voltage among the at least two output voltages to control the operation of the LED emitting device;
a regulator converting a second output voltage among the at least two output voltages into a voltage suitable for the operation of the LED panel unit; and
a multi-channel control unit controlling an operation of the regulator according to a lowest minimum voltage among the voltage of a plurality of LED channels and receiving the first output voltage to generate a first feedback voltage VF1.

2. The LED emitting device of claim 1, wherein
the multi-channel control unit detects a load of the LED panel unit to stop the operation of the regulator when the LED panel is in a no-load state.

3. The LED emitting device of claim 1, wherein
the converter includes:
a transformer converting the input voltage input to a primary first winding according to operation of a power source switch to transmit to a secondary second winding and a third winding;
a first rectifying diode connected to the second winding;
a second rectifying diode connected to the third winding; and
a first capacitor connected to the first rectifying diode,
wherein the first output voltage is a voltage of the first capacitor.

4. The LED emitting device of claim 3, wherein
the regulator includes:
a power source supply switch connected to the second rectifying diode and operated according to control of the multi-channel control unit to output the voltage of the third winding passing through the second rectifying diode; and
a second capacitor connected to the power source supply switch,
wherein the second output voltage is a voltage of the second capacitor.

5. The LED emitting device of claim 4, wherein
the multi-channel control unit includes:
a minimum voltage detecting unit sampling a plurality of channel voltages as a unit of a predetermined time to detect the lowest minimum voltage; and
a switch control unit generating a gate signal to control the switching operation of the power source supply switch for the minimum voltage to be maintained as a predetermined reference voltage.

6. The LED emitting device of claim 5, wherein
the switch control unit detects a plurality of dimming signals controlling each on/off function of the plurality of LED channels generated from the micom board to determine the LED panel to be in the no-load state and to turn off the power source supply switch when the plurality of dimming signals turn off all the plurality of LED channels.

7. The LED emitting device of claim 4, wherein
the multi-channel control unit includes:
a first resistor including one terminal transmitted with the output voltage; and
a shunt regulator including an input terminal connected to one terminal of the resistor and an output terminal of which the voltage is maintained as a constant voltage if the voltage of the input terminal is more than a predetermined threshold voltage,
wherein the voltage of the output terminal is the first feedback voltage, and as the voltage of the input terminal is increased to be more than the threshold voltage, the current from the output terminal of the shunt regulator to the ground is increased.

8. The LED emitting device of claim 7, further comprising
an opto-diode connected between the output terminal of the shunt regulator and the predetermined reference voltage, and an opto-coupler including an opto-transistor flowing with the current corresponding to the brightness of the opto-diode.

9. The LED emitting device of claim 8, further comprising
a switch control unit generating a gate signal controlling a switching operation of the power source switch according to the current flowing in the opto-transistor.

10. The LED emitting device of claim 8, wherein
the multi-channel control unit further includes
a third capacitor connected between the output terminal of the shunt regulator and the input terminal.

11. The LED emitting device of claim 4, wherein
the multi-channel control unit determines an overflowed voltage of the second output voltage by using the second feedback voltage according to the second output voltage and detects the LED channel that is in an open state among the plurality of LED channels by using a plurality of channel feedback voltages corresponding to a plurality of channel currents flowing in the plurality of LED channels.

12. The LED emitting device of claim 11, wherein
the multi-channel control unit further includes a protection circuit unit comparing the second feedback voltage with the predetermined first reference voltage to determine it as the overflowed voltage if the second output voltage is a higher voltage than the reference voltage, determining the generation of the LED channel that is in the open state if a smaller voltage than the predetermined second reference voltage is detected among the plurality of channel feedback voltages, and generating a protection signal to stop the switching operation of the power source supply switch.

13. The LED emitting device of claim 1, further comprising
a current balancing unit connected to an end terminal of the plurality of LED channel and controlling a channel current of the plurality of LED channels.

14. The LED emitting device of claim 13, wherein
the current balancing unit includes:
a plurality of transistors respectively connected to the plurality of LED channels; and
a plurality of resistors connected to the plurality of transistors and generating a plurality of channel feedback voltages corresponding to a plurality of channel currents flowing in the plurality of LED channels.

15. The LED emitting device of claim 14, wherein
the multi-channel control unit further includes a gate signal generator receiving a dimming signal controlling the duty of the plurality of LED channels from the micom board to control each on/off function of the plurality of LED channels, and receiving the plurality of channel feedback voltages to generate a plurality of gate signals controlling the plurality of transistors such that the plurality of LED channels flow with a constant current.

* * * * *